US011279033B2

(12) United States Patent
Graichen et al.

(10) Patent No.: US 11,279,033 B2
(45) Date of Patent: Mar. 22, 2022

(54) METHOD AND APPARATUS FOR COLLISION-FREE MOTION PLANNING OF A MANIPULATOR

(71) Applicant: PILZ GMBH & CO. KG, Ostfildern (DE)

(72) Inventors: Knut Graichen, Ostfildern (DE); Andreas Voelz, Ostfildern (DE); Daniel Bakovic, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 229 days.

(21) Appl. No.: 16/568,309

(22) Filed: Sep. 12, 2019

(65) Prior Publication Data

US 2020/0086486 A1 Mar. 19, 2020

(30) Foreign Application Priority Data

Sep. 13, 2018 (DE) ..................... 10 2018 122 376.5

(51) Int. Cl.
*B25J 9/16* (2006.01)
(52) U.S. Cl.
CPC ........... *B25J 9/1666* (2013.01); *B25J 9/1676* (2013.01)
(58) Field of Classification Search
CPC ...... B25J 9/1666; B25J 9/1676; B25J 9/1656; B25J 9/1664
See application file for complete search history.

(56) References Cited

U.S. PATENT DOCUMENTS

| 9,689,696 | B1* | 6/2017 | Russell ................. B25J 9/1666 |
| 2011/0196533 | A1 | 8/2011 | Scheurer et al. |
| 2017/0348856 | A1 | 12/2017 | Nakaya et al. |
| 2019/0232496 | A1 | 8/2019 | Graichen et al. |
| 2019/0240833 | A1* | 8/2019 | Kimura ................. B25J 9/0081 |

FOREIGN PATENT DOCUMENTS

| DE | 102010007458 A1 | 8/2011 |
| DE | 102015009815 A1 | 2/2017 |
| DE | 102016120763 A1 | 5/2018 |

OTHER PUBLICATIONS

Haojie Zhang et al.; Combining Global and Local Planning with Guarantees on Completeness; exact date unknown, but at least prior to Sep. 13, 2018; 7 pp.
Muhammad Imran et al.; A Hybrid Path Planning Technique Developed by Integrating Global and Local Path Planner; exact date unknown, but at least prior to Sep. 13, 2018; 5 pp.

(Continued)

*Primary Examiner* — Spencer D Patton
(74) *Attorney, Agent, or Firm* — Miller Johnson

(57) ABSTRACT

A method for collision-free motion planning of a first manipulator of a robotic control apparatus from a starting point to a destination point. The method includes repeatedly determining a target path of the first manipulator to the destination point with a global planner, continuously determining a movement of the first manipulator with a local planner based on a current target path of the global planner, and performing the movement by the first manipulator in parallel with the determination by the global planner and the local planner.

20 Claims, 5 Drawing Sheets

(56) References Cited

OTHER PUBLICATIONS

Michael Otte et al.; RRTx: Real-Time Motion Planning/Replanning for Environments with Unpredictable Obstacles; exact date unknown, but at least prior to Sep. 13, 2018; 16 pp.
Eiichi Yoshida et al., Reactive Robot Motion using Path Replanning and Deformation; May 2011; 7 pp.
Sáchnez et al.: A Reactive Lazy P RM Approach for Nonholonomic Motion Planning; IBERAMIA-SBIA 2006, LNAI 4140, pp. 542-551, 2006.
Kunz et al.: Real-Time Path Planning for a Robot Arm in Changing Environments; The 2010 IEEE/RS J International Conference on Intelligent Robots and Systems Oct. 18-22, 2010, Taipei, Taiwan.
Quinlan et al.: Elastic Bands: Connecting Path Planning and Control; 1050-4729/93 $3.00 © 1993 IEEE.
Park et al.: ITOMP: Incremental Trajectory Optimization for Real-Time Replanning in Dynamic Environments; University of North Carolina at Chapel Hill http://gamma.cs.nnc.edu/ITOMP/ Association for the Advancement of Artificial Intelligence (www.aaai.org).
Zube, A.: Cartesian Nonlinear Model Predictive Control of Redundant Manipulators Considering Obstacles; 978-1-4799-7800-7/15/ S31.00 © 2015 IEEE.
Otte et al.: RRTX: Asymptotically optimal single-query sampling-based motion planning with quick replanning; The International Journal of Robotics Research 2016, vol. 35(7) 797-822.
Sun, W.: High-Frequency Replanning Under Uncertainty Using Parallel Sampling-Based Motion Planning; IEEE Transactions on Robotics, vol. 31, No. 1, Feb. 2015.
Dimitrov et al., "Hierarchical Navigation Architecture and Robotic Arm Controller for a Sample Return Rover," 2013 IEEE International Conference on Systems, Man, and Cybernetics, 2013, pp. 4476-4481, DOI 10.1109/SMC.2013.761.

\* cited by examiner

METHOD AND APPARATUS FOR COLLISION-FREE MOTION PLANNING OF A MANIPULATOR

CROSS-REFERENCE TO RELATED APPLICATION

This application claims priority from German patent application DE 10 2018 122 376.5 filed on Sep. 13, 2018. The entire content of the priority application is incorporated herein by reference.

BACKGROUND OF THE INVENTION

This disclosure relates to a method for collision-free motion planning of a manipulator from a starting point to a destination point as well as a corresponding apparatus with at least one manipulator and a control unit, which executes the method.

In robotics, collision-free motion planning is the task of finding a motion path for a robot or manipulator from a starting point to an end point, without a collision with an obstacle or with itself occurring during the movement. A method for collision-free movement planning is known, for example, from DE 10 2010 007 458 A1.

DE 10 2010 007 458 A1 shows collision-free motion planning for an industrial robot with a single robot arm (manipulator), such as is used in production plants. Industrial robots are working machines for handling, assembling or processing workpieces. An industrial robot usually comprises at least one manipulator with several motion axes and a programmable controller that coordinates the robot's motion sequences during operation by controlling the robot's drives accordingly.

The use of robots close to humans requires motion planning methods that are able to calculate collision-free movements with minimum delay. In particular, planning methods must be capable of adapting to a constantly changing environment to take account of moving obstacles. The latter requires a re-planning or adaptation of the planning during the movement of the robot.

A continuous re-planning of the motion planning of a robot is difficult with known global path planning methods, for example based on dynamic roadmaps (DRM), if the dynamics of the robot cannot or not sufficiently be considered. For example, well-known global planners usually carry out path planning initially without taking robot dynamics into account, and only take robot dynamics into account during subsequent time parameterization of a found path. The execution of the time-parameterized path is then monitored for potential collisions with moving obstacles and the robot is safely stopped in the event of a potential collision. From the safe position, new re-planning takes place so that the robot can continue its way adapted to the new conditions. Moving obstacles in the environment lead to frequent stops and thus to slow and unnatural movements of the robot.

One way to consider the dynamics of the robot more effectively is kinodynamic motion planning, as described in "RRTx: Real-time Motion Planning/Re-planning for Environments with unpredictable obstacles" (Michael Otte). However, kinodynamic motion planning is based on probabilistic methods, which have the disadvantage that they do not generate deterministic trajectories and the required computing time for such methods may be limited, but is generally not predictable. Deterministic methods, however, such as DRM-based methods, are not suitable for kinodynamic motion planning.

In addition, local reactive methods such as artificial potential fields are known as alternatives for changing environments. These generate control impulses for the movement of the robot instead of complete trajectories. The control impulses "push" the robot away from obstacles, for instance, in the direction of a defined destination. These methods do not distinguish between planning and control, but react immediately to obstacles. This makes it possible to react particularly quickly to moving obstacles. The problem, however, is that these approaches based on local optimization can get stuck in local minima and are therefore only of limited use for high-dimensional robots in complex environments.

SUMMARY OF THE INVENTION

It is an object to provide an optimized motion planning for a robot in a changing environment, which avoids the above mentioned disadvantages. Further, it is an object to specify motion planning that takes into account the dynamics of a robot. Yet further, it is an object to specify motion planning that allows continuous re-planning without stopping or speed reduction.

According to one aspect of the present disclosure, there is provided a collision-free motion planning method of a first manipulator from a starting point to a destination point, with the steps:
  repeatedly determining a target path of said first manipulator to the destination point with a global planner;
  continuously determining a movement of the first manipulator with a local planner based on the current target path of the global planner;
  performing the movement by the first manipulator in parallel with said determination by said global planner and said local planner.

It is therefore an idea to combine repeated global planning with continuous local planning for the motion planning of a robot. "Continuous" in this context means that a re-planning takes place continuously, for instance, in a defined interval. "Repeated", on the other hand, means that the global planner has to carry out re-planning at least once. The repeated determination of the target path is initiated unmotivated, i.e. a new determination of the target path is initially executed regardless of whether the current target path is still valid or still executable. In contrast to known methods, re-planning is therefore consciously carried out even if the environment has obviously not changed for the local planner. Thus, re-planning by the global planner does not have to be "triggered" by a local planner. In this way, global planning can find a shorter target path if, for example, an obstacle disappears from the previously planned target path.

Therefore, according to the present disclosure, two different planners, local and global, are used which are executed in parallel, complement each other and, in particular, take each other into account in the respective planning. Parallel in this context means parallel in time, i.e. the planners are processed in parallel, e.g. in threads.

The global planner creates a globally planned path and the local planner, which can generate fast control actions, avoids collisions with obstacles while considering the globally planned path. The robot or manipulator is thus guided along the globally planned path and "pushed away" from obstacles at the same time. Both planners, global and local, are executed several times in a loop and can make use of each other's results.

The combination of both planners has the advantage that on the one hand the problem of local minima can be avoided, since the local planner is "guided" by the global planner, and on the other hand global planning becomes more "dynamic", since the local planner optimizes the target path locally. In particular, global planning can continue to be essentially purely kinematic planning and the usual path smoothing and time parameterization is replaced by path-following control using the local planner.

Through continuous planning with the local planner and complementary re-planning with the global planner, motion planning can be optimally adapted to a changing and complex environment, as the disadvantages of one process are offset by the advantages of the other. In particular, the dynamics of the robot can be sufficiently taken into account during the planning phase, enabling re-planning without stopping and speed reduction of the robot as well as seamless adaptation of the movement in a changed environment. This allows for a proactive avoidance of moving obstacles and the use of shorter paths if obstacles are removed.

In a further refinement, the global planner continuously determines the current target path. By allowing the global planner to plan not just repeatedly, but continuously, a complex dynamic environment can be reliably taken into account, as a new target path is constantly determined. In the case of continuous determination, the planner can also carry out re-planning initially unmotivated, i.e. independent of the validity of the current target path.

In a further refinement, the global planner is a deterministic planner, especially based on a dynamic roadmap (DRM). Deterministic planners have the advantage over probabilistic methods that they provide a deterministic trajectory, i.e. a unique and reproducible solution within a defined period of time. With probabilistic methods, the required computing time can generally also be limited, but is regularly unpredictable. Since the combination of the global planner with a local planner does not make any demands on the type of global planner, the use of a deterministic planner is advantageous for a fast deterministic re-planning of collision-free movements in dynamically changing environments. The determination of the target path by the global planner can be based on a dynamic roadmap (DRM). Global planning with a DRM-based planner has the advantage that it enables fast and deterministic global path planning at runtime.

In a further refinement, the global planner inquires a result from the local planner during re-planning and takes it into account when determining the target path. The global planner can therefore take into account the results of parallel local planning in each interval. In particular, the global planner can ask the local planner for a predicted, current start state and take it into account as a new start state during re-planning. Accordingly, re-planning does not have to assume a rest position, as is generally the case. In other words, the dynamics of the robot are taken into account so that the robot does not have to stop first to carry out a re-planning. This refinement thus contributes to a more even and natural movement of the robot.

In a further refinement, the local planner is based on model predictive control (MPC) and the determination of the movement is based on optimization by solving a dynamic optimization problem. Optimization-based methods are particularly suitable for motion planning in order to find paths that allow a smooth and natural motion of a robot or its manipulator. The paths are deterministic and therefore reproducible and can be determined in finite computing time. At the same time, a planner based on model predictive control can comprehensively consider a large number of variable parameters and thus in particular the dynamics of the robot.

In a further refinement, the dynamic optimization problem includes a cost function that weights a deviation of the manipulator from the target path and a deviation of a current path parameter from a target parameter specified by the target path. In that the dynamic optimization problem takes into account deviations from a target path and a current path parameter during planning, the local planner is linked to the global planner in an advantageous way. The target path is thus an integral part of the dynamic optimization problem and the global planner "guides" the local planner, which usually works with shorter cycle times.

In a further refinement, the dynamic optimization problem also includes path dynamics and path input constraints, whereby the path dynamics are based in particular on the target path of the global planner. In that the local planner takes into account the path dynamics, in particular the path dynamics of the target path, natural movement of the robot can be further improved.

In a further refinement, the dynamic optimization problem also includes at least one inequality constraint for a distance to collisions. By additional inequality restrictions a minimum distance to obstacles can be defined, which has to be considered when solving the optimization problem. In this way a collision with obstacles can be avoided. At the same time, the manipulator does not have to adhere categorically to the specified target path, but can deviate from it depending on the situation, e.g. in order to reach its destination more quickly. The movement of the robot thus becomes more natural in relation to the changing environment.

In a further refinement, the execution of the determination by the global planner is adjustable via a defined condition. The execution of the global planner can therefore be linked to conditions, whereby the planning can react to particularities and special cases in global planning, for instance, automatically. In this way, more robust motion planning can be achieved.

An unconditional, no or conditional execution of the determination by the global planner can be set via the defined condition. With the distinction between unconditional, no or conditional execution dynamically selectable settings are feasible that allow an appropriate reaction to special cases that can occur in global planning.

Conditional execution can be dependent on whether a determined target path and/or a determined movement is valid in a defined planning horizon and whether a distance between a current status and a target status was reduced during a last cycle step. Finding of no valid paths or no progress in planning are special cases that can be taken into account by the conditional execution. This makes motion planning more robust.

In a further refinement, moving the first manipulator is paused if planning by the global planner fails. Alternatively, moving the first manipulator will continue exclusively based on the local planner if planning by the global planner fails. Pausing or continuing planning exclusively via the local planner are two alternative approaches that can be applied to the combination of two planners according to the present disclosure as a reaction to special cases of the global planner. The robustness of motion planning can thus be further increased.

In a further refinement, the global and/or local planner partially predicts a movement of an obstacle and/or the global and/or local planner artificially enlarges a representation of an obstacle. By artificially enlarging obstacles or predicting the movement of obstacles, planners are required to re-plan ahead of time in order to avoid collisions. In this way, in particular a fault tolerance can be increased in order, for example, to take into account of uncertainties in the estimation appropriately.

In a further refinement, the method further includes additional motion planning for at least one second manipulator and the additional motion planning is carried out in parallel and coordinated with the collision-free motion planning of the first manipulator. With this method, motion planning can easily be carried out for several manipulators, for example on a two-arm robot. For example, the global planner can have a separate DRM for each manipulator in order to determine a coordinated target path for both manipulators. The local planner then works on the determined coordinated target path to execute the movement. Since the same algorithms can basically be used for this, a movement of several manipulators can be easily implemented.

It goes without saying that the features mentioned above and the features to be explained below can be used not only in the combination indicated, but also in other combinations or uniquely, without leaving the scope of this invention.

BRIEF DESCRIPTION OF THE DRAWINGS

Exemplary embodiments of the invention are shown in the drawings and are explained in more detail in the following description. In the drawings.

DETAILED DESCRIPTION OF THE PREFERRED EMBODIMENTS

Figure 1:
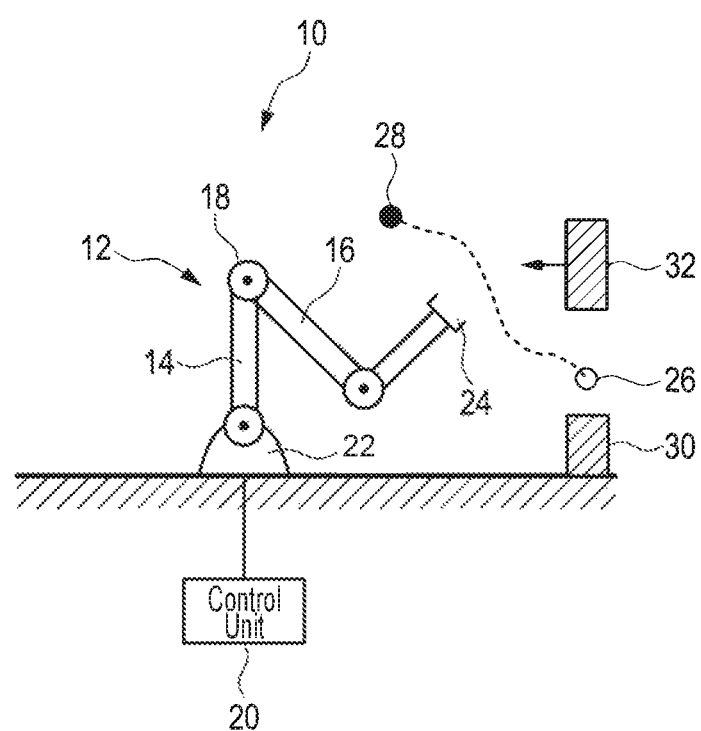
FIG. 1 shows a schematic representation of an exemplary embodiment of the apparatus.

In FIG. 1, an exemplary embodiment of the apparatus in its entirety is denoted with reference numeral 10.

The apparatus 10 is here an industrial robot 12. Industrial robots are universal, programmable machines for handling and assembling work-pieces with at least one manipulator 14, which enables physical interaction with the environment and performs the mechanical work of the robot. The manipulator 14 can include axes 16 with drive units, such as motors, gears, encoders (not shown here) and joints 18 for the mechanical coupling of the axes 16. The drive units are controlled by a control unit 20, which can be designed as a programmable computing unit and which coordinates the movement of the robot and the manipulator.

In the exemplary embodiment shown in FIG. 1, the robot 12 is a fixed robot with a base 22 on which a manipulator 14 is movably mounted. The manipulator 14 comprises here exemplarily three axes 16 and three joints 18. At the end of the manipulator 14 an end effector 24 is arranged, which is illustrated here exemplarily as a gripper. The control unit 20 coordinates the movement of the robot 12 and the manipulator 14 and can be integrated into the robot 12 or connected to it as an external device.

It goes without saying that a fixed robot is only one possible configuration of a robot to which the method according to the present disclosure can be applied. Alternatively, mobile robots, robots with several manipulators or robots with a modular control unit divided into a number of components are conceivable. Likewise, the process is not limited to industrial robots, but can also be applied to other automated machines.

In addition to controlling the drives, controlling the robot also includes collision-free motion planning, i.e. searching for a motion path for the robot or its manipulator from a starting point 26 to an end point 28 without colliding with itself or an obstacle. Obstacles can be static 30 or moving obstacles 32. The latter requires that motion planning does not have to be carried out once, but several times, if an originally planned path has become invalid due to an obstacle. Collision-free motion planning for dynamic environments is the subject of the method according to the present disclosure, which is explained in more detail below with reference to FIG. 2.

Figure 2:
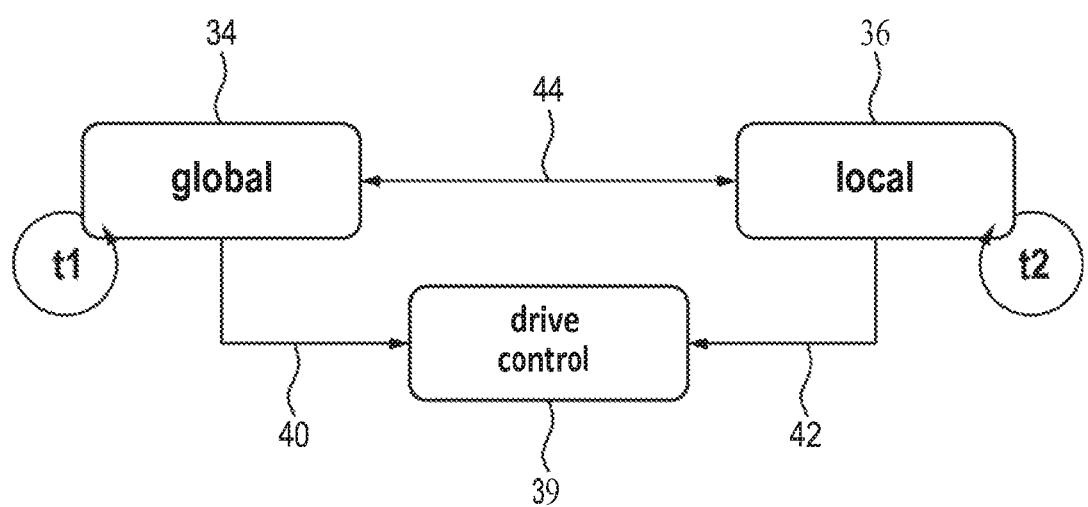
FIG. 2 shows a schematic representation of an exemplary embodiment of the method.

FIG. 2 shows a schematic representation of a method according to an exemplary embodiment of the present invention.

The method comprises three processes, which can be executed in parallel. The first process and the second process are planning processes. The third process comprises the actual control of the robot. Parallel in this context means that the processes are executed in parallel, e.g. in synchronous or asynchronous threads.

The first process is repeated motion planning with a global planner 34 and the second process is continuous motion planning with a local planner 36. The third process executes the planning generated by the first and second planners 34, 36 by controlling the drives 39 of the robot.

A global planner 34 in the sense of the present disclosure is a planner which determines a target path from a defined starting point to a defined destination point. Kinematic path planning is sufficient for this. In other words, the global planner does not need to perform path smoothing or time parameterization to determine an actual trajectory for the movement, as this is achieved by path-following control using the local planner 36.

The result of each run of the global planner, if such can be found, is a kinematic path planning, i.e. a possible target path to the destination point. In an exemplary embodiment, the starting point or a starting state can vary in each run based on the results of the local planner 36.

A local planner 36 in the sense of the present disclosure is a planner which works reactively, i.e. instead of an entire path, the local planner 36 generates immediate control impulses as a reaction to the environment. The local planner 36 thus initiates movements that can "push" the robot away from obstacles in order to avoid collisions, whereby the overall movement can be "driven" in the direction of a destination point. The method can include a prediction of the dynamics over a horizon and allow the consideration of constraints.

The combination according to the present disclosure is designed such that both planners influence the third process, i.e. the control of the drives 39. Accordingly, the global and the local planner 34, 36 may not be executed independently of each other, but in mutual exchange. The local planner 36 can build on the results 40 of the global planner 34 and the global planner 34 can take the results 42 of the local planner 36 into account in re-planning. The exchange is indicated here by the arrow 44 and realized by the implementation of the respective planners 34, 36. The exchange 44 can therefore be an integral part of the respective planner.

The global planner 34 plans repeatedly, i.e. he carries out at least one new planning during the movement. The local planner 36 always plans continuously, i.e. planning takes place continuously, especially in a fixed cycle $T_2$. In an exemplary embodiment, global planning may also take place continuously, for instance, also in a fixed cycle $T_1$. Cycle $T_1$ can be many times larger than cycle $T_2$, for example by a factor of 10 to 30, in particular 20, and essentially depends on the worst-case calculation times of the individual steps.

A new planning by the global planner 34 takes place unmotivatedly, i.e. the global planner 34 carries out at least one new planning that has not been triggered externally. In other words, global re-planning is initially independent of whether an old solution is still valid or not.

Generally, the method according to the present disclosure is not limited to a specific implementation of the respective planner. Other global planners, which can repeatedly generate a target path, or other local planners, which can use the target path of a global planner as reference, are conceivable to be combined in the sense of the present disclosure.

Figure 3:
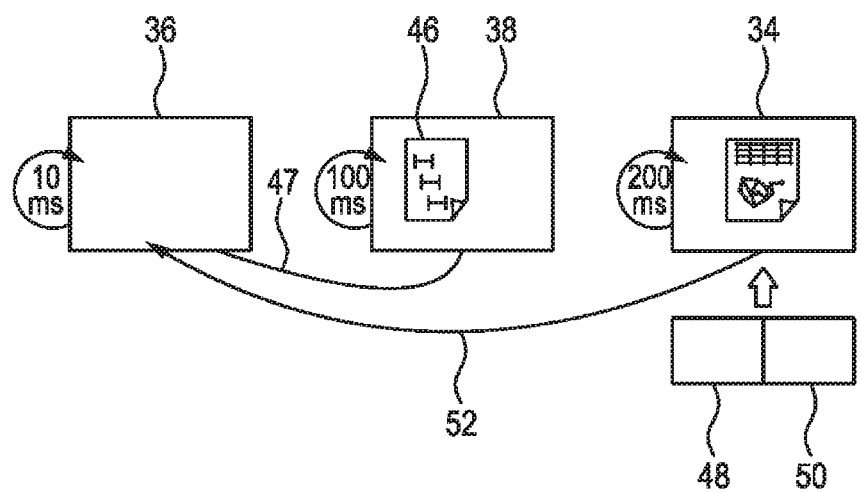
FIG. 3 shows a further exemplary embodiment of the method.

With reference to FIG. 3, examples of a global planner and a local planner and their combination are explained in more detail below. The same reference signs here denote the same parts as before.

The method includes planning with a global planner 34 and with a local planner 36. In this exemplary embodiment, planners 34, 36 are supplemented by a modeler 38, which includes an environment model 46 and can provide a distance map 47 for the local planner 36.

In the exemplary embodiment according to FIG. 3, the global motion planning of the global planner 34 is based on a dynamic roadmap (DRM). Dynamic roadmaps are a planning approach for changing environments that require frequent replanning. A DRM includes a graph G=(V, E) in a configuration space C of the robot and mapping rules. The mapping rules map the rasterized work area W to nodes V and edges E in graph G. They are used in the planning phase to quickly identify valid parts of the graph for specific obstacles.

The DRM-based planning approach basically comprises two phases: A preliminary phase and a planning phase.

In a preliminary phase, a random configuration q(u) is first assigned to each of the n nodes, where u∈V. The configuration is only checked for self-collision, since an empty environment is assumed in this phase. Subsequently, the $k_{nn}$ nearest neighbors v∈V of each node are determined using a distance metric d(u, v)=d(q(u), q(v)) to generate the edges (u, v)∈E of the graph. The choice of the distance metric is an important factor influencing the quality of the roadmap.

The mapping $\phi_v$: W→V and $\phi_e$: W→E indicate for each voxel w∈W which nodes and edges of the graph G are invalid if the voxel is occupied by an obstacle. All configurations and movements corresponding to the nodes and edges in the graph are rasterized to generate the inverse mapping rules $\phi_e^{-1}$: V→W and $\phi_v^{-1}$: E→W. With the inverse mapping rules, a mapping of the DRM can be done easily.

In the planning phase, the DRM is used to find a valid path between a start configuration $q_S$ and a target configuration $q_G$. First, start and destination are connected with their $k_{nn}$ nearest neighbors in the graph. This is the only step that requires a collision check during the planning phase. Then all voxels intersecting with obstacles are identified and the mapping rules $\phi_v$ and $\phi_e$ are used to invalidate all nodes and edges of the graph that lead to the collision. Subsequently, the shortest valid way between start and destination is searched. The result corresponds to a target path in the sense of the present disclosure.

With DRM-based planners, planning times of less than 100 milliseconds can be achieved on standard hardware. Furthermore, the size of the roadmap can be scaled up to one million nodes through parallel implementation on GPUs.

Planning using DRM is repeated, that is, a target path is determined multiple times at different times. Global planning can also take place continuously in fixed intervals. In FIG. 3, for example, a global re-planning is carried out every 200 milliseconds. The global planner 34 thus works in a continuous loop and creates a current target path until either the destination has been reached or the planning is to be terminated. The latter is the case if the predicted trajectory is invalid within a global sampling time t∈[0, $\Delta t_{global}$] or if the maximum execution time has expired.

In an exemplary embodiment, the execution of the continuous determination by the global planner can be set via a defined condition. The execution of the global planner 34 can thus be influenced by one or more policies. A distinction can be made between general planning policies 48 and policies for error cases 50.

Planning policies 48 can be used to specify when the global planner is to be called to determine a current target path. A defined condition can provide for an unconditional, no, or conditional execution of the global planner. Unconditional execution carries out global planning in each cycle, whereas solely local planning is used if the defined condition does not allow execution of the global planner. In contrast, with conditional execution, you can use various criteria to determine whether or not the planner is to be executed. One criterion can be, for example, whether the predicted trajectory is not valid for the entire horizon. Another or complementary criterion can be whether the distance between the current state and the target state has decreased during the last cycle, i.e. whether the local planner has made sufficient progress towards the destination.

The policies for error cases 50, on the other hand, can intervene if the global planner cannot find a valid path, either because there is no solution or because the dynamic roadmaps are incomplete. In this case, the corresponding behavior can be defined via the policies for error cases 50. The robot may, for example, enter a wait state in which the current state is defined as the target path. Alternatively, the previous target path can be maintained.

The local planner 36 will then either try to "hold" the current position or continue along the previously valid path. As another option, a theoretical, direct path can also be set as a new path through the policies for error cases 50, so that the local planner is urged to reach the destination directly, regardless of any obstacles. In this case, the local planner is essentially on its own and unaffected by global planning.

Using planning policies 48 and policies for error cases 50, the motion planning can thus be flexibly adapted to the respective scenario, thus increasing the application possibilities of the new method.

The target paths determined here with the DRM-based planner serve as an input for the local planner 36, as shown here by arrow 52. The local planner 36 works continuously, for example, as shown here, with a cycle time of 10 milliseconds.

In this example, the local planner 36 is based on model predictive control and is also referred to as the Model Predictive Controller (MPC). Model predictive control determines the actual control of the manipulators and has, among other things, the task of collision avoidance and path tracking. For this purpose, an optimization problem is solved in each cycle and the first part of the optimal solution is used as the control input. The target path p(s) with s∈[0, $s_G$], generated by the global planner 34, serves as a guide for the local planner 36, thus avoiding the problem of local minima. An optimization problem can be formulated as shown in FIG. 4.

Figure 4:
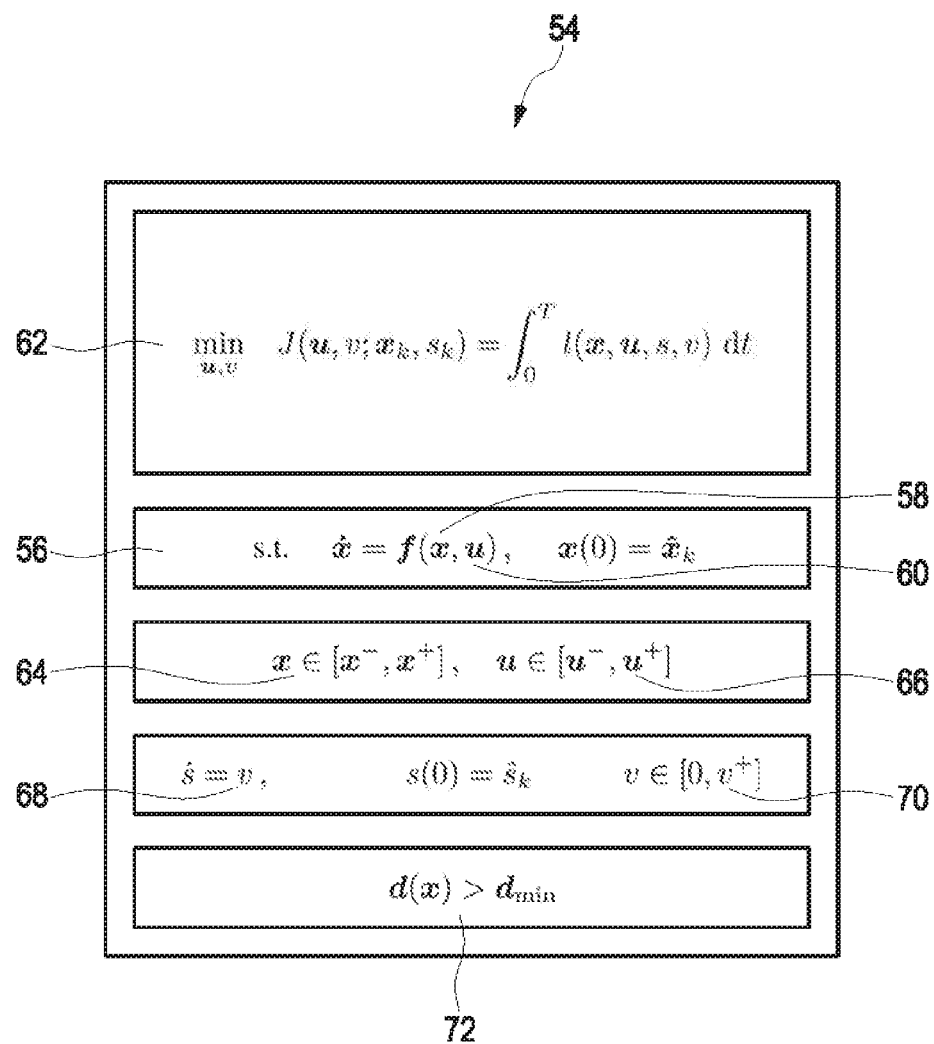
FIG. 4 shows a formal representation of an optimization problem of a local planner.

FIG. 4 shows a formal representation of an optimization problem of an example of a local planner 36.

The starting point for the dynamic optimization problem 54 is a system model, which describes the dynamics 56 of the moving system, i.e. here the manipulator 14, with states 58 and control variables 60. The dynamics 56 can be assumed simplified as integrator $\dot{q}=u$ with states $x=q$ and control variables $\dot{q}$ or as double integrator $\ddot{q}=u$ with states $x[q^T,\dot{q}^T]$ and control variables $u=\dot{q}$.

If the calculated trajectory is to be executed directly, the double integrator may be used, since the minimum and maximum acceleration can be taken into account here.

A cost function 62 weights the states 58 and the control variables 60. The task of optimization is to find the optimum control function from the usually infinite number of control functions, which minimizes the cost function 62. The states 58 may be subject to state restrictions 64 and the control variables 60 to control variable restrictions 66.

To couple the local planner 36 to the global planner 34, the cost function 62 additionally weights a deviation of the manipulator 14 from the target path as well as a deviation of a current path parameter s, i.e. the current position and/or the current state, from a target parameter $s_G$ specified by the target path.

The deviation between the current path parameter s and the target parameter $s_G$ may not be weighted quadratically, since the dimension of the gradient depends on the distance to the destination. Instead, the cost function 62 uses the absolute value and changes to the quadratic weighting if the absolute value is smaller than a defined threshold value $\Delta s$. In this way, oscillations in the vicinity of the destination can be avoided.

Furthermore, the dynamic optimization problem 54 can include path dynamics 68 and path input constraints 70. Path dynamics 68 are based on the target path of the global planner 34. Figuratively speaking, the local planner follows the globally planned path as if suspended from a spring.

In addition, the dynamic optimization problem 54 can include at least one inequality constraint 72 over which obstacles can be taken into account. The inequality constraints 72 take into account a distance to self-collisions and/or a distance to collisions with obstacles 30, 32.

To calculate the distance for self-collision, an approximation of the robot by spheres with center and radius can be used. To calculate the distance for collisions with obstacles, the environment can be approximated by a raster map, whereby the required distances result from the Euclidean distance transformation of the raster map. The smallest distance is taken into account either to the self-collision and/or to the collision with an obstacle. The rasterization of obstacles and the Euclidean distance transformation can be calculated in advance (modeler 38), so that the real-time capability of the optimization is not affected.

In order to take fast moving obstacles into account, an estimation of the movement of obstacles and a short prediction can be implemented in the planner. Since both dynamic roadmaps and optimization-based planners are based on a rasterized representation of the work area W, there is no information about when an object is at a specific position. However, additional voxels can be blocked along the direction of movement of an obstacle and/or a representation of an obstacle can be artificially enlarged, allowing the planner to react early to obstacles. Thereby, robustness of the method can be increased.

Figure 5:
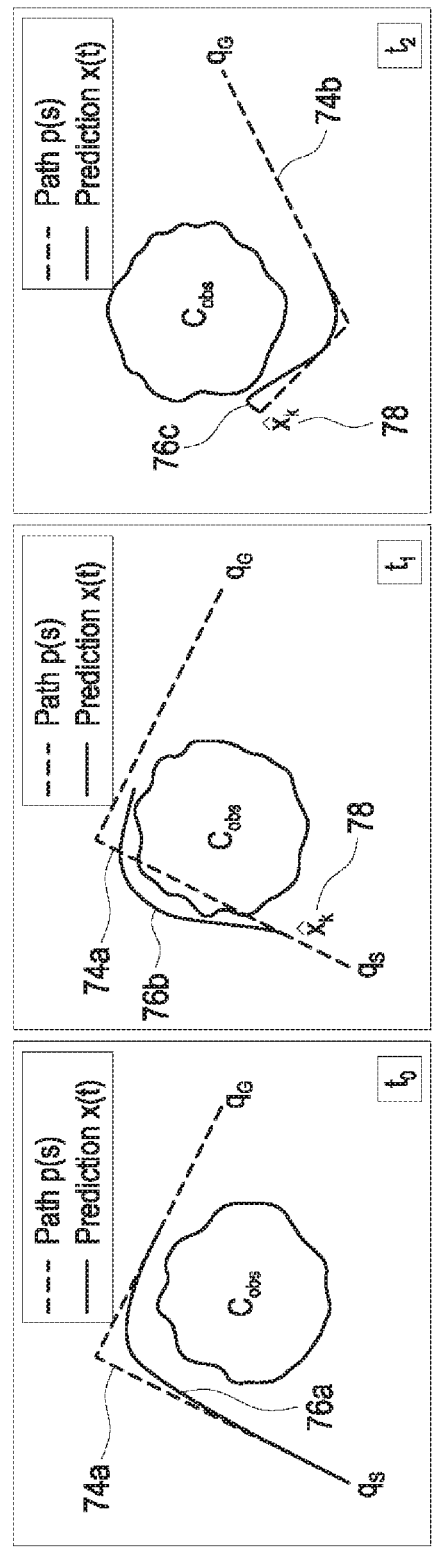
FIG. 5 shows an exemplary motion planning according to an exemplary embodiment of the method in case of a moving obstacle.

FIG. 5 concludes with a schematic illustration of a possible movement using path planning with a combined global planner and local planner.

FIG. 5 shows a two-dimensional configuration space C with an obstacle defining an invalid region $C_{obs}$. The globally planned target path p(s) 74 is used as a guide for the local optimization-based planner, which determines the actual movement in the form of the path x(t) 76.

In FIG. 5, three successive points in time are illustrated from left to right in the diagrams shown next to each other.

In the first diagram, the local planner 36 generates a path 76a that deviates from the target path 74a in order to be able to proceed faster. In the second diagram, after the obstacle has moved, the local planner 36 generates path 76b to avoid a collision with the obstacle. As soon as a new global path 74b is calculated, the local planner 36 automatically adjusts the movement to the new target path 74b, as shown in the last diagram. As shown here, the global planner 34 can request an intermediate result in the form of a predicted position 78 from the local planner 36 and take it into account when determining the new target path 74b of the manipulator 14.

It goes without saying that the implementations presented here are only understood as examples of the method and apparatus according to the present disclosure. Other implementations may also be covered by the subject matter according to the present disclosure. Generally, the scope of protection of the present application is given by the claims and is not limited by the description or the features shown in the figures.

What is claimed is:

1. A method for collision-free motion planning of a first manipulator from a starting point to a destination point, the method comprising:
   repeatedly determining a target path of the first manipulator to the destination point with a global planner;
   continuously determining a movement of the first manipulator with a local planner based on a current target path of the global planner; and
   performing the movement by the first manipulator in parallel with the determination by the global planner and the local planner,
   wherein, in response to failure of planning by the global planner, moving the first manipulator is continued exclusively based on the local planner.

2. The method of claim 1, wherein the global planner continuously determines the target path.

3. The method of claim 1, wherein the global planner comprises a deterministic planner.

4. The method of claim 3, wherein the deterministic planner is based on a dynamic roadmap (DRM).

5. The method of claim 1, wherein the global planner inquires a result of the local planner during re-planning and takes the result into account when determining the target path.

6. The method of claim 1, wherein the local planner is based on model predictive control (MPC) and the determination of the movement is based on optimization by solving a dynamic optimization problem.

7. The method of claim 6, wherein the dynamic optimization problem comprises a cost function that weights a deviation of the first manipulator from the target path and a deviation of a current path parameter from a target parameter specified by the target path.

8. The method of claim 7, wherein the dynamic optimization problem further comprises path dynamics and path input constraints.

9. The method of claim 8, wherein the path dynamics are based on the target path of the global planner.

10. The method of claim 6, wherein the dynamic optimization problem further comprises at least one inequality constraint for a distance to collisions.

11. The method of claim 1, wherein at least one of the global planner and the local planner are used to perform at least one of:
partially predicting a movement of an obstacle and
artificially enlarging a representation of an obstacle.

12. The method of claim 1, further comprising additional motion planning for at least a second manipulator, wherein the additional motion planning is carried out in parallel and coordinated with the collision-free motion planning of the first manipulator.

13. The method of claim 1, wherein the determining the target path with the global planner is performed continuously, repeating at a rate that is at least one order of magnitude slower than a rate at which the continuously determining with the local planner is repeated.

14. A method for collision-free motion planning of a first manipulator from a starting point to a destination point, the method comprising:
repeatedly determining a target path of the first manipulator to the destination point with a global planner;
continuously determining a movement of the first manipulator with a local planner based on a current target path of the global planner; and
performing the movement by the first manipulator in parallel with the determination by the global planner and the local planner,
wherein execution of the determination by the global planner is adjustable via a defined condition, and
wherein an unconditional execution, no execution, or conditional execution of the determination by the global planner can be set via the defined condition.

15. The method of claim 14, wherein the conditional execution depends on:
whether at least one of a determined target path and a determined movement is valid in a defined planning horizon and
whether a distance between a current state and a target state has been reduced during a last determination cycle of the local planner.

16. The method of claim 14, wherein moving the first manipulator is paused in response to failure of planning by the global planner.

17. A robotics control apparatus comprising:
a manipulator; and
a control unit configured to:
implement a global planner and a local planner,
repeatedly determine a target path of the manipulator from a starting point to a destination point with the global planner,
continuously determine a movement of the manipulator with the local planner based on a current target path of the global planner,
actuate the movement by the manipulator in parallel with the determination by the global planner and the local planner; and
in response to failure of planning by the global planner, continue actuating the movement of the manipulator exclusively based on the local planner.

18. The robotics control apparatus of claim 17, wherein:
execution of the determination by the global planner is adjustable via a defined condition and
an unconditional execution, no execution, or conditional execution of the determination by the global planner can be set via the defined condition.

19. The robotics control apparatus of claim 18, wherein the conditional execution depends on:
whether at least one of a determined target path and a determined movement is valid in a defined planning horizon and
whether a distance between a current state and a target state has been reduced during a last determination cycle of the local planner.

20. The robotics control apparatus of claim 17, wherein the control unit is configured to determine the target path with the global planner continuously, repeating at a rate that is at least one order of magnitude slower than a rate at which the movement is determined with the local planner.

* * * * *